United States Patent [19]

Snelling et al.

[11] 3,996,322
[45] Dec. 7, 1976

[54] METHOD OF PRODUCING A TUBULAR FOAMED PLASTIC ARTICLE

[75] Inventors: Charles D. Snelling, Allentown; Theodore E. Andrews, Kutztown; John J. Weller, Emmaus, all of Pa.

[73] Assignee: Armstrong Cork Company, Lancaster, Pa.

[22] Filed: July 3, 1973

[21] Appl. No.: 376,234

Related U.S. Application Data

[62] Division of Ser. No. 228,130, Feb. 22, 1972, Pat. No. 3,790,320.

[52] U.S. Cl. .............................. 264/45.7; 264/51; 264/269; 264/310
[51] Int. Cl.² ............ B29D 27/04; B29C 5/04
[58] Field of Search ............ 264/45, 51, 53, 335, 264/54, 45.7, 314, 310, 312, 173, 269

[56] References Cited

UNITED STATES PATENTS

| | | | |
|---|---|---|---|
| 1,729,172 | 9/1929 | Lundin | 264/312 X |
| 2,958,907 | 11/1960 | Mumford et al. | 264/45 |
| 3,052,927 | 9/1962 | Hoppe et al. | 264/46 |
| 3,118,800 | 1/1964 | Snelling | 264/173 X |
| 3,293,337 | 12/1966 | Rosato et al. | 264/54 X |
| 3,297,802 | 1/1967 | Powers | 264/45.7 |
| 3,354,244 | 11/1967 | Davidson | 264/51 |
| 3,366,718 | 1/1968 | Komada | 264/45 |
| 3,366,719 | 1/1968 | Lueders | 264/54 X |
| 3,396,773 | 8/1968 | Alderfer | 264/45 X |
| 3,439,075 | 4/1969 | Bauer et al. | 264/45 |
| 3,510,548 | 5/1970 | Dicks et al. | 264/51 |
| 3,530,208 | 9/1970 | Rausing | 264/45 |
| 3,566,449 | 3/1971 | Goins et al. | 264/51 UX |
| 3,651,180 | 3/1972 | Glueckert | 264/51 |
| 3,754,064 | 8/1973 | Snelling et al. | 264/335 X |
| 3,764,641 | 10/1973 | Ash | 264/314 X |

FOREIGN PATENTS OR APPLICATIONS

| | | | |
|---|---|---|---|
| 1,038,667 | 8/1966 | United Kingdom | 264/45 |
| 914,584 | 1/1963 | United Kingdom | 264/54 |

*Primary Examiner*—Philip Anderson
*Attorney, Agent, or Firm*—Hopgood, Calimafde, Kalil, Blaustein & Lieberman

[57] ABSTRACT

The invention contemplates a machine and method whereby rotation of an annular mold is used to develop a homogenous longitudinal and radial distribution of foaming plastic. The foaming plastic is introduced into the mold cavity during mold rotation and, particularly where mold-cavity length substantially exceeds mold-cavity diameter, a longitudinal traverse is imparted to the introduction of foaming material during rotation of the mold. The cavity is closed to permit foamed filling of the mold, and a polymerizing cure is effected prior to mold opening and product removal. The particular machine herein described is notable (a) for its ready mechanical release from both inner and outer molding contact with the product, (b) for its inherent adaptability to production of a selected one of a plurality of inner and outer profiles and sizes in the product, and (c) for its safe accommodation of fast-foaming and curing plastics, even for relatively large product diameter or girth.

9 Claims, 17 Drawing Figures

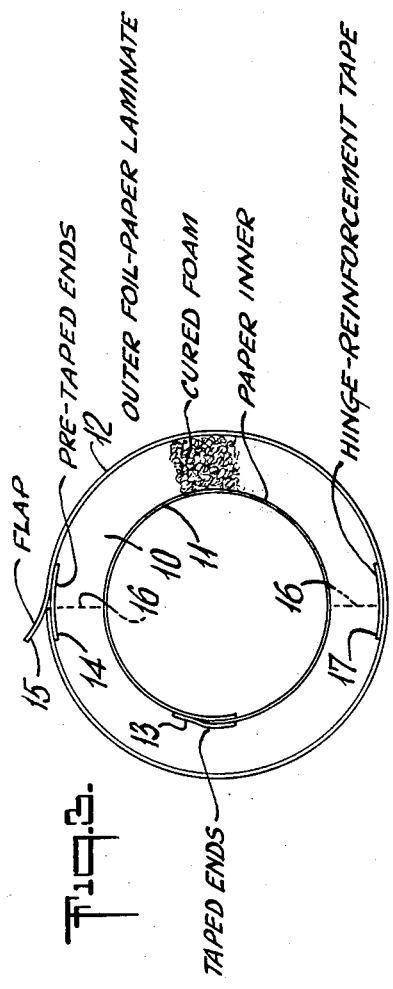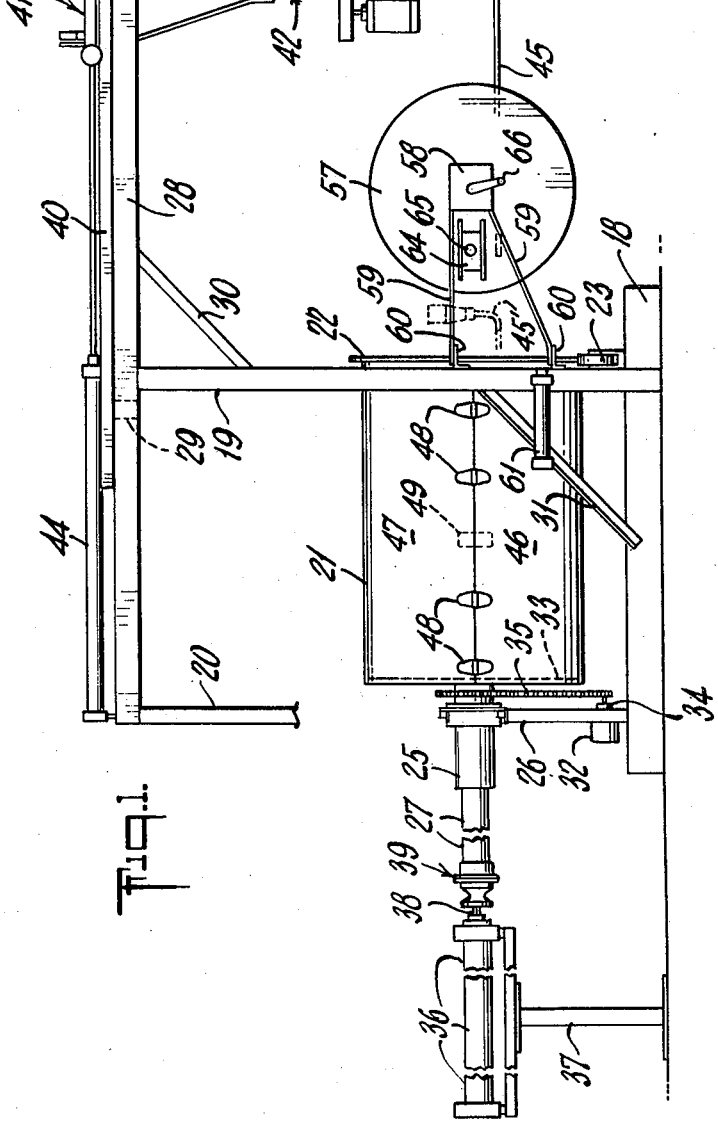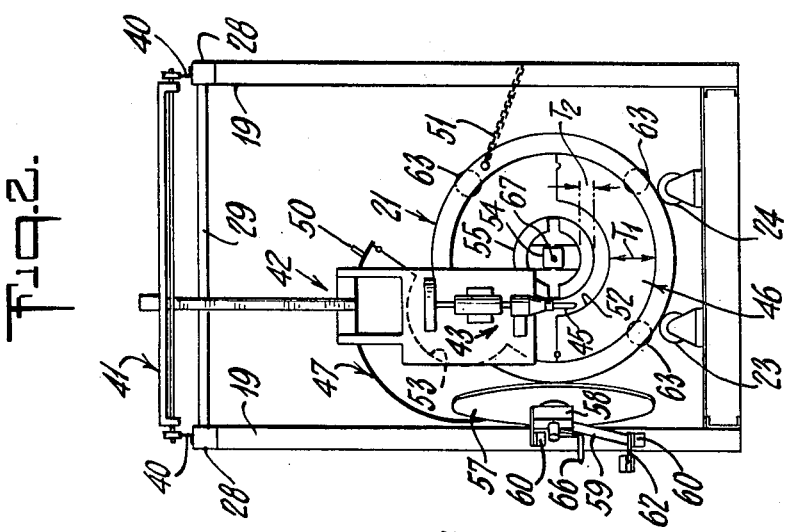

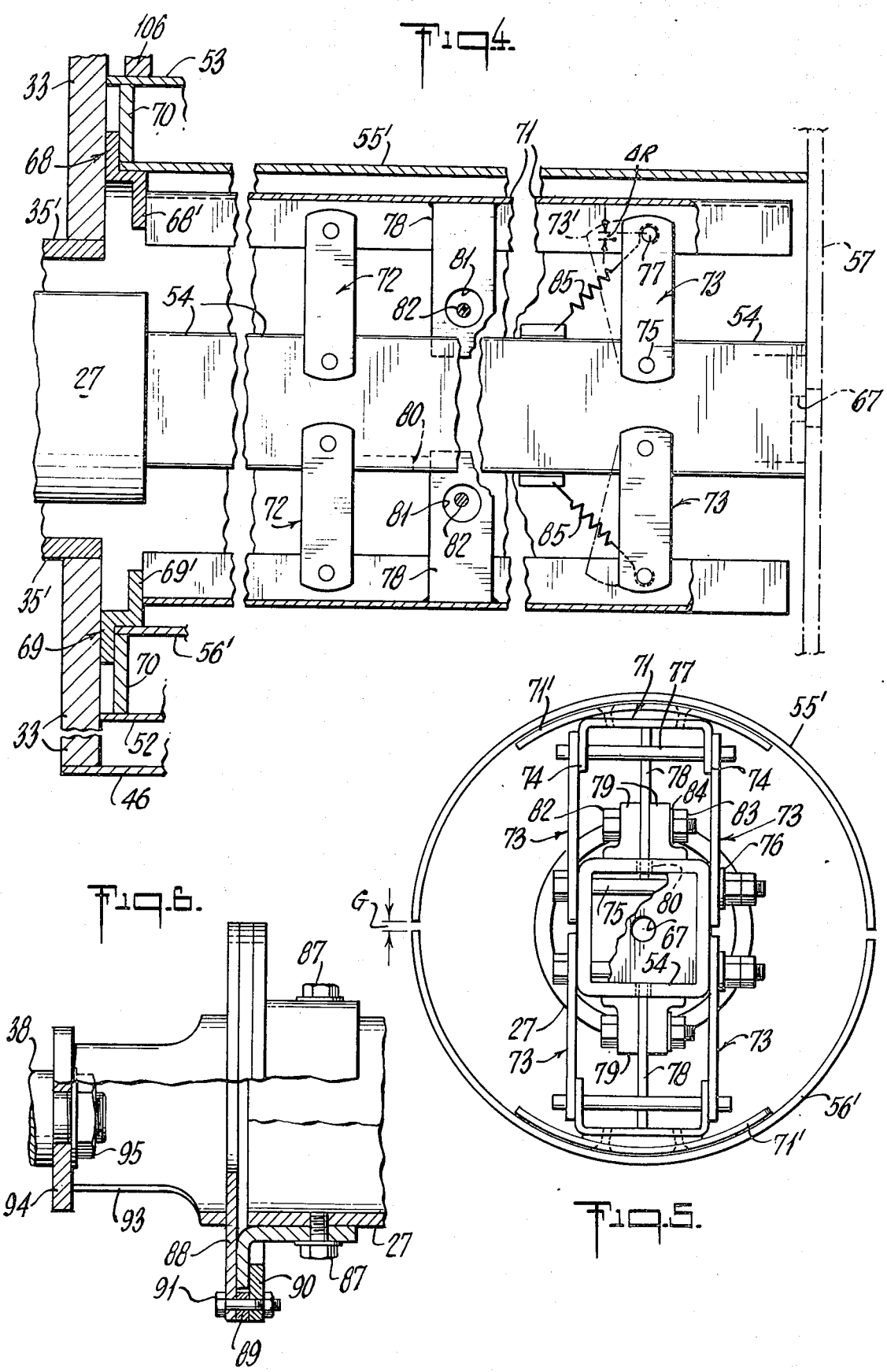

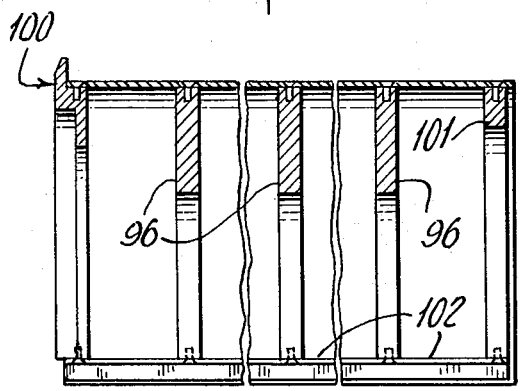
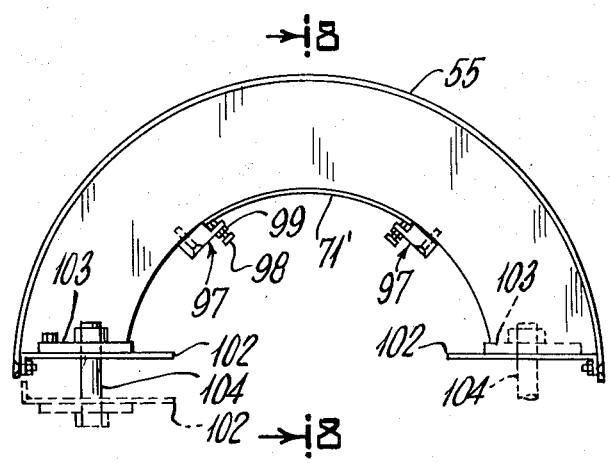
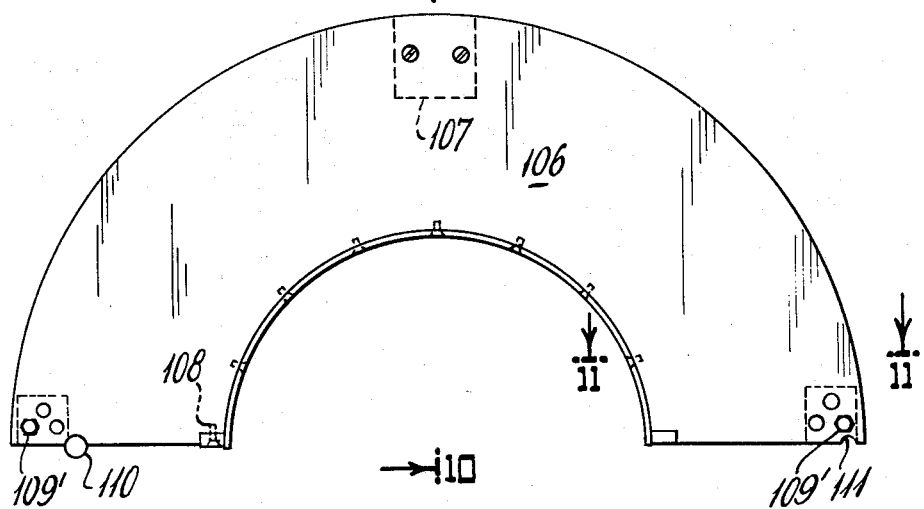
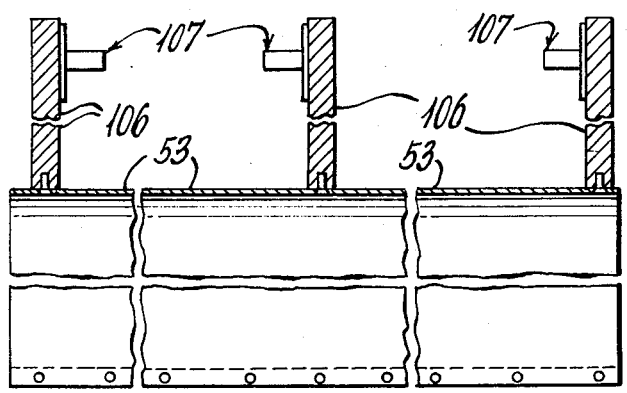
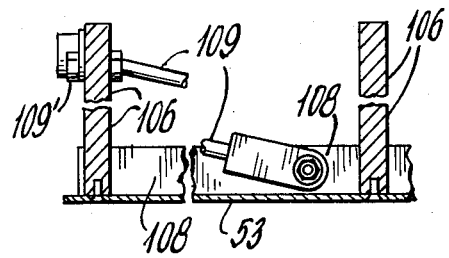

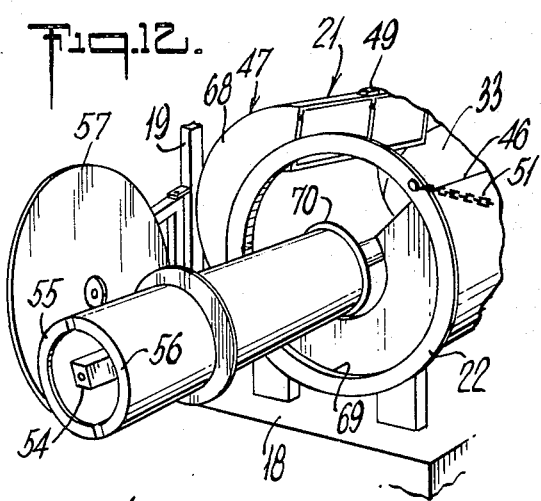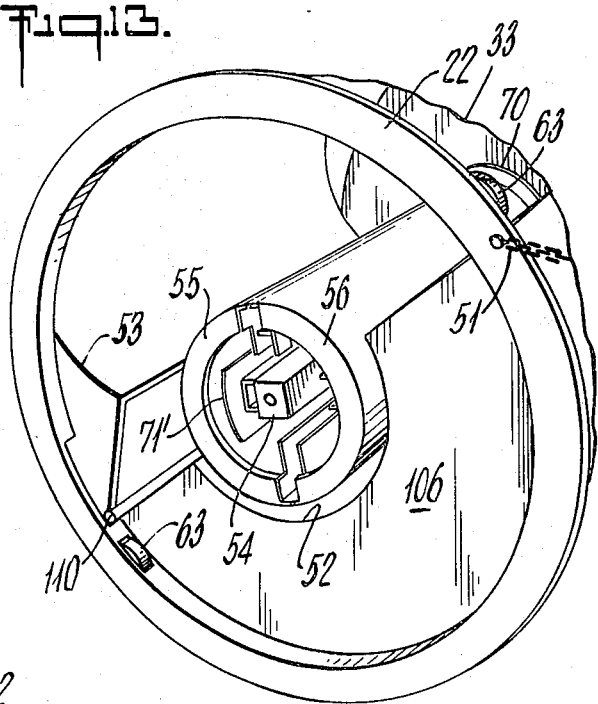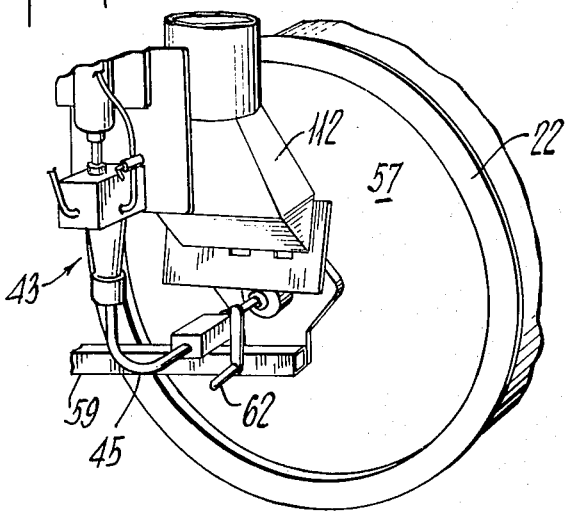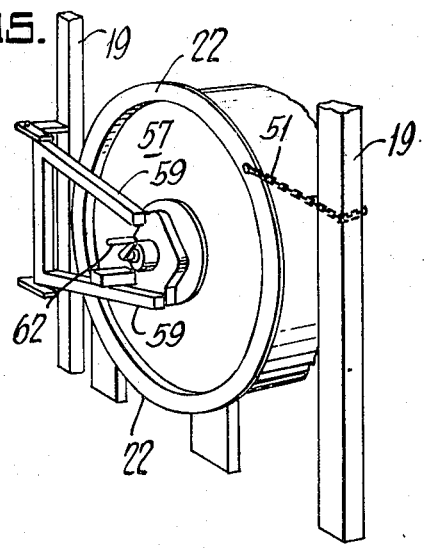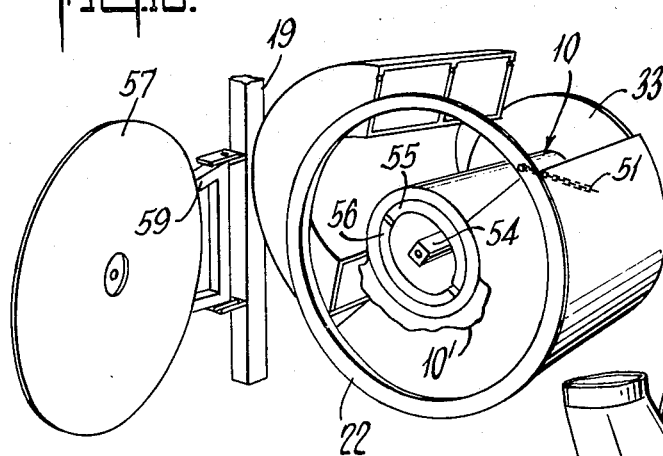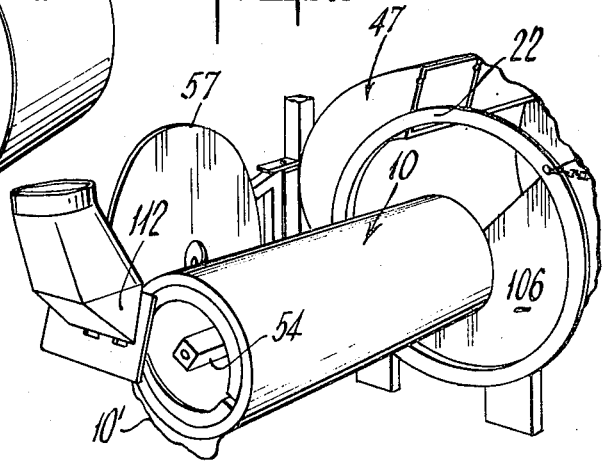

METHOD OF PRODUCING A TUBULAR FOAMED PLASTIC ARTICLE

This application is a division of application Ser. No. 228,130, filed Feb. 22, 1972, now U.S. Pat. No. 3,790,320.

This invention relates to a method of producing homogeneous tubular castings of foamed-plastic material, as for example, cylindrical castings of pipe-insulating conduit.

Snelling U.S. Pat. No. 3,118,800 and pending Snelling, et al., Application Ser. No. 69,661, filed Sept. 4, 1970 and now U.S. Pat. No. 3,754,064, describe means and methods for continuously casting foamed conduit of the character indicated. But while these techniques are inherently applicable to a variety of product sizes, with various inner and outer diameters and thicknesses, a certain amount of trial and error, with attendant wastage of materials, is almost necessarily involved in setting up the production of any given product size. Moreover, the wastage is such that only large-production runs are economically feasible. Thus, these existing means and methods are economically inadequate to the task of achieving smaller-scale production, particularly of the larger product sizes.

It is, accordingly, an object to provide an improved method of the character indicated.

Another object is to provide an improved method inherently adapted to economical production of foamed tubing in small units.

A further object is to provide an improved method inherently adapted to economical production of foamed tubing of unusually large sizes.

It is also an object to achieve the above objects with a machine and method adapted to ready changeover from one to a selected other of a relatively large variety of sizes, with regard to inner and outer diameter, and with regard to thickness.

A general object is to achieve the foregoing with an absolute minimum of material waste, with a minimum of down-time for size changeover, and with an inherent capacity to produce the finest-quality product, adhering to close tolerance limitations.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 1 is a simplified view in elevation of a machine embodying the invention;

FIG. 2 is a right-end view of the machine of FIG. 1;

FIG. 3 is an end view of a product of the method and means of the invention, with legend identification of illustrative component elements;

FIG. 4 is an enlarged fragmentary view, partly broken-away and in section, of inner-mold elements of the machine of FIG. 1;

FIG. 5 is a right-end view of the structure of FIG. 4;

FIG. 6 is a fragmentary longitudinal sectional view of a coupling in the actuating and supporting means for the structure of FIGS. 4 and 5;

FIG. 7 is an end view of an inner-mold part usable in the machine of FIG. 1;

FIG. 8 is a partly broken, sectional view, taken in the plane 8—8 of FI. 7;

FIG. 9 is an end view of an outer-mold part usable in the macine of FIG. 1;

FIG. 10 is a partly broken sectional view, taken in the plane 10—10 of FIG. 9;

FIG. 11 is a view similar to FIG. 10 to show a modification; and

FIGS. 12 to 17, inclusive, are simplified views in perspective to illustrate steps in the method of the invention.

In FIGS. 1 and 2, the invention is shown in application to a machine for producing foamed-plastic tubular articles, such as the pipe-insulation conduit shown in FIG. 3. In general, such conduit comprises a standard length, for example a 4-foot length, of cured foamed plastic material 10, intimately bonded to inner and outer sheaths 11–12, which may be of flexible plastic or paper sheeting; for insulating purposes, the outer sheath 12 is preferably a laminate incorporating a reflective metallic foil. FIG. 3 additionally reveals that the inner sheath 11 is wrapped from flat sheet stock, with overlapping ends secured as by pressure-sensitive adhesive tape 13. In like manner, tape 14 secures the ends of the outer sheath 12, leaving an external flap 15 which is used by the customer to make his installation. Before shipment to the customer, the article of FIG. 3 is longitudinally sliced into semi-cylindrical halves, divided at the diametrical alignment 16 and hinged at a reinforcing hinge tape 17 which is preassembled to the inner surface of outer sheath 12. The flap 15 remains after slicing, as by the slitting machine disclosed in U.S. Pat. No. 3,715,941, issued Feb. 13, 1973, and is used to lap adjacent severed edges of the conduit after its assembly over a length of pipe.

The machine of FIGS. 1 and 2 comprises a rigid floor-mounted frame, built on a base 18 and including upstanding front and rear members 19–20 for rotational support of a cylindrical mold assembly 21 on a horizontal axis. Two of the three points of mold support are provided by an end flange 22 of the mold assembly, riding spaced frame-based idler rolls 23–24 at the front end; the remaining point of support is established by a bearing 25 on a standard 26, which may form part of the rear upright structure 20. A tubular tailpiece 27 forms part of the mold assembly 21 and is longitudinally slidable and rotatable in bearing 25. Upper longitudinal members 28 secure the upstanding members 19–20 on the respective sides of the mold assembly, being fixedly spaced by a tie member 29. Corner braces 30–31 establish the rigid integrity of upper and lower ends of the upright frame members 19–20 to the horizontal members 28. An electric motor 32, mounted to standard 26, provides rotary drive to the rear wall 33 of the mold assembly, via reduction gearing 34 and sprocket means 35; the speed of mold rotation is relatively slow, being preferably such as to induce less than 1-g modulation in the gravity vector applicable to moldable material within mold 21. Fluid-pressure operated means 36 is floor-mounted on a rear pedestal 37 and includes a double-acting rod 38, coupled by means 39 to the tailpiece 27.

Parallel longitudinal rails 40 atop members 28 longitudinally guide the wheels of a carriage 41 which spans the width of the described frame and which includes underslung structure 42 for carrying a head 43 for the mixing and mold-feeding of ingredients of foamable molding material. Fluid-pressure operated means 44 carried by upper members 28 provide double acting positioning drive to carriage 41 along its rails 40; such displacement mechanism is used to advance an elongate discharge pipe 45 (at the downstream end of head 43) longitudinally into and out of the cavity within the molding assembly 21, all as will be more fully explained.

The molding assembly 21 is contained within a large external cylinder or shell, comprising semi-cylindrical segmental elements 46–47, hinged at 48 along one pair of their adjacent outer longitudinal edges and releasably clamped along the other pair of their adjacent outer longitudinal edges; such clamping is suggested by dashed outlines 49 in FIG. 1, at what will be understood to be a location diametrically opposite to the hinge axis of means 48. The semi-cylindrical shell element 46 includes the rear end wall 33 by which tailpiece 27 is secured to the molding assembly; at its front end, element 46 includes the front-supporting annular flange 22. On the other hand, when clamp means 49 is released and with shell element 46 positioned generally below the central axis of the mold assembly (as shown), the other shell element 47 may be raised about its hinge connection 48, as by lifting the same by a handle 50 to the raised position shown in FIG. 2. A removable chain connection 51 from part of flange 22 to part of an adjacent frame member will hold the mold assembly against rotation when opening a mold element, such as the movable shell element 47.

The outer shell elements 46–47 serve as mounting references for a selected set of insert mold elements, of selected thickness $T_1$, for the coaxial positioning of semi-cylindrical arcuate outer-mold segments 52–53 about the mold axis; these insert parts will be more fully described in connection with FIGS. 9 to 11. The bore of the finished article (FIG. 3) is defined by collapsible inner-mold structure based on a central mandrel 54, which is united with tailpiece 27 over a region of telescoped overlap therewith in the vicinity of bearing 25; mandrel 54 is shown conveniently formed of square tubing and extends the full length of the inner-volume of the mold assembly 21 when actuator 36 is in the fully retracted position shown in FIG. 1. Mandrel 54 is thus always a cantilevered projection beyond bearing 25, and in the fully advanced condition of actuator 36, mandrel 54 is fully projected beyond the open end of the mold assembly 21. Semi-cylindrical inner-mold segments 55–56 are removably secured to the retractable structure borne by mandrel 54; the segments 55–56 are selected as a set, appropriate to the desired inside diameter or other contour of the molded product (FIG. 3) and will be more fully described in connection with FIGS. 7 and 8.

To complete the general identification of parts in FIGS. 1 and 2, a circular door 57 is rotatably supported at bearing means 58 offset by a bracket or arm 59 having a hinged connection to the frame; as shown, the hinge axis is vertical, being conveniently provided at hinge lugs 60 on one of the front uprights 19. Pressure-fluid actuating means 61 having a linked connection to a crank offset 62 of bracket 59 facilitates door manipulation from the fully open position of FIGS. 1 and 2, to a fully closed position in which door 57 is faced to the described mold parts, within the annular flange 22. Flange 22 is shown fitted with plural spaced idler rollers 63, having preferably crowned outer contours, to receive and coaxially locate door 57 in its closed position. A radially guided gate 64 in door 57 has an opening 65 to insertably receive the tube or wand 45 for injecting foaming material into the otherwise closed mold assembly 21, as part of the molding procedure which will be more fully described. Finally, clutching means including a hand crank 66 provides for selective clutching of door 57 to mandrel 54 after molding material has been injected into and wand 45 removed from the mold assembly 21; the handcrank 66 will be understood, for example, to be rotatable within the rotary bearing for door 57 and to have an inwardly projecting threaded end, engageable in a matching tapped hole 67 in the forward end face of the mandrel 54, so that door-clutching to mandrel 54 results from hand-cranked bolting at 67.

FIGS. 4 and 5 provide detail of the mandrel 54, its retraction mechanism, and the means for support of inner-mold segments, the latter being identified 55'–56' in FIGS. 4 and 5 because they are there shown for the smallest size which can be accommodated by the particular retraction mechanism. Mandrel 54 is shown for FIG. longitudinally retracted position wherein semi-circular flange members 68–69, which define and reinforce the rear ends of segments 55'–56', are abutted to the rear wall 33 of the mold assembly 21. This is the condition of readiness for molding and for accepting closure of door 57 (phantom outline), to abutment with the front ends of mandrel 54 and the mold segments 55'–56' and 52–53, the latter being shown as small fragments in left corners of FIG. 4. Each of the semi-circular flanges 68–69 comprises a radially outward portion for abutment with wall 33 and serving as a stop for a circumferentially continuous backing ring or plate 70 to close the annular space between inner and outer mold segments and thus define the back axial end of the molded product. Flanges 68–69 also include a radially inward portion 68' (69') for coaction with the retraction mechanism, as will be explained.

It will be recalled that back wall 33 is the part of the mold assembly 21 to which rotary drive is imparted by sprocket means 35; in FIG. 4, the broken-away member 35' secured to wall 33 will be understood to be a part of this drive system, as for example part of the hub of the toothed wheel by which sprocket connection is made to the drive means 32–34. Wall 33 is thus a large circular plate to which the outer-shell part 46 is fixedly mounted, and to which the other outer-shell part 47 is hingedly closed.

Each of the inner-mold segments 55'–56' is served by its own retraction mechanism, which is basically a four-bar linkage wherein an elongate channel 71 and the mandrel 54 are the two longitudinally extending parallel members, and wherein at least two longitudinally spaced parallel and radially extending link means 72–73 complete the linkage. An elongated cylindrically arcuate shoe plate 71' is fixedly carried by channel 71 and is effectively a part thereof; shoe plate 71' is the means of removably mounting a selected inner-mold segment 55' (55) to the collapsible supporting structure.

The detailed description which will be given to the upper four-bar linkage, for mold element 55' in FIG. 4, will be understood to apply for all such linkages, meaning for the lower element 56' in the case of the two-segment inner mold structure shown.

Channel 71 extends almost the full longitudinal extent of the mold cavity, being shown in radially slidable, axial abutment with the end flange portion 68', and in axially spaced relation with the front radial end plane of the mold cavity, established by the inner surface of the closed door 57. Conveniently, the side walls 74 of flange 71 define an overall channel width which matches the width of mandrels 54, and each of the link means 72–73 is a pair of like link straps, as shown. Thus, the pair of straps for link means 73 ride outer cheeks of the longitudinal members 54–71; they are pinned to mandrel 54 by a single bolt 75, lock-nutted to desired loading via washer means 76, and they are connected to channel walls 74 by a pin 77 which is readily removable, as suggested in FIG. 5 by cotter-pin holes in pin 77. The radial displacement of each channel (71) is stabilized by a plurality of longitudinally spaced guide plates 78, centrally welded to the bottom of the channel (71) and having limited freedom of small axial and radial displacement between adjacent spaced guide faces of a pair of lug brackets 79 fixed to mandrel 54. Each plate 78 is free to pass through local opening 80 in the mandrel and is provided with an oversize aperture 81 to accommodate the shank of a clamp bolt 82. A nut 83 frictionally loads the clamp via a lock washer 84 to the extent needed to achieve wobble-free guidance of plate 78, as will be understood. A tension spring 85 between pin 77 and a fixed point on the mandrel provides rearwardly biased loading of the four-bar linkage, in the collapsing direction; the extent of such collapse is limited by edge abutment of the inner-mold segments 55'–56', upon closure of the gap G (FIG. 5), at which closure the link means 73 will have displaced from the fully extended position (full lines in FIG. 4) to the retracted position (light phantom outline 73').

It will be seen that, upon initial forwardly thrust displacement of mandrel 54 (via its tailpiece 27), spring tension at 85 (aided by drag friction due to the presence of molded product between segments 52–53 and 55'–56') is operative to collapse the inner-mold segments, to the extent of the radial decrement ΔR. The closed gap G determines a collapsed abutment of outer longitudinal member 71 of the two opposed four-bar linkages, so that back flanges 68 can positively drive the backing ring 70 to expel the molded product as the mandrel continues its forward stroke. Once clear of the shell structure 46–47, the molded product is externally accessible and free for manual or automatic extraction from the collapsed inner-mold structure.

FIG. 6 is a fragmentary, partly broken-away and longitudinally sectioned view of the coupling means 39 (FIG. 1) between the piston rod 38 and the mandrel tailpiece 27. This coupling is designed to allow rotation of tailpiece 27 without necessarily inducing rotation of the rod 38. A first radial flange fitting 86 has a hub bolted at 87 to tailpiece 27, and a second fitting has a radial flange 88 faced to flange 86 and circumferentially surrounding the same with a running clearance. As shown, the surrounding parts comprise a spacer ring 89 of thickness slightly exceeding that of flange 86, and a retaining ring 90 radially overlapping spacer 89 and flange 86; bolts 91 unite rings 89–90 to flange 88. A tubular adapter neck 92 with a local side-access port 93 connects flange 88 to a centrally apertured plate 94, to which the reduced threaded end of rod 38 is fastened by a nut 95.

FIGS. 7 and 8 illustrate a typical semi-cylindrical inner-mold segmental shell 55 for defining a product-bore diameter substantially larger than the minimum-diameter situation depicted in FIG. 5. Shell 55 is reinforced by plural spaced arcuate ribs 96 of inner radius which conforms to that of the retractable mounting shoe 71'. As shown, ribs 96 are symmetrically astride the shoe 71', being retained by a fastening lug 97 adjacent each shoe-edge intercept with one of the ribs 96. As seen in FIG. 7, the longitudinal edge of the shoe 71' angularly locates against the recessed heel of each lug 97, and a bolt 98 and lock nut 99 are the means for clamping the mold-insert assembly to shoe 71'. Semi-circular end-flange means 100 reinforces the back end of the segmental shell 55 and at the same time provides the backing-ring and mold-expanding abutment functions indicated for flange means 68–69 of FIG. 4. Another but radially thinner semi-circular rib 101 reinforces the forward end of shell 55, and longitudinal edge plates 102 are secured to all ribs 96–100–101 and to adjacent ends of shell 55 to complete the structural integrity of the replaceable inner-mold component.

For larger-size inner-mold components 55, as in FIGS. 7 and 8, a reinforcing plate 103 is secured to both ends of each plate 102. Rugged nut and bolt means 104 pass through aligned openings in adjacent plates 103 of adjacent edge-ends of the two semi-cylindrical component assemblies (for shells 55–56); preferably, the bolt is threaded to the plate 103 adjacent the nut of means 104, so that a locked setting can be established whereby the bolt is a guide for the accurate alignment of adjacent edges of shells 55–56, for each resetting of the expanded condition of inner-mold components assembled to mandrel 54.

FIGS. 9 to 11 illustrate the outer-mold component analogue for the inner-mold component of FIGS. 7–8. As shown, the inner shell 53 of this component is a semi-cylindrical arcuate segment of what, with its complementary other component 52, will determine the molded outer diameter of the product (FIG. 3). Semi-circular arcuate ribs 106 are secured to shell 53 at longitudinally spaced locations. Each of these ribs builds out the mold-component body radius to match that of the hinged outer shell 47 (FIG. 1) and is provided with anchor lugs 107 having radial tapped holes by which to replaceably secure the component to its shell 47. Longitudinal edge-reinforcement bars 108 secure the alignment of edges of shell 53 and are themselves secured to each of the ribs 106, as suggested by means 108' (FIG. 9). Diagonal rod bracing 109 (FIG. 11) at each of several angular locations and in the space between ribs 106 may be provided, if necessary, to assure integrity of coaxial positioning of all parts of the surface of mold shell 53, as will be understood; in FIGS. 9 and 11 such bracing is shown at the angular extremes, being fastened by nuts 109' at the end face of an end rib 106. Finally, a precision-mounted large dowel 110 on an axis parallel to the axis of hinge means 48 (FIG. 1) is fixed to the radial edge of each rib 106, for mating location in a conforming recess in the corresponding ribs of a similar outer-mold replacement component (for the unhinged remainder 46 of the outer shell); at the diametrically opposite extreme, ribs 106 are locally recessed (at 111) to receive and locate a smaller-size dowel (not shown) carried by the adjacent structure of the unhinged component for mold shell 52. The structure of the component for mold shell 52 is otherwise as described for shell 53, and coaxial registry of shells 52–53 is assured upon setting the clamp means 49 (FIG. 1).

OPERATION

Operation according to the method of the invention will be best understood from a description of a typical cycle, having additional reference to the sequence of FIGS. 12 through 17. A cycle may be deemed to start just after product removal at completion of the previous cycle; this situation is depicted in FIG. 12, wherein the mandrel 54 (with its inner-mold segmental shell assemblies 55–56) is fully projected out the open end of the mold assembly 21. The four-bar linkages within the inner-mold structure are collapsed, allowing the backing ring 70 to be reassembled and pushed all the way back to abutment with flanges 68–69. The outer-mold assembly 47–106–53 is hinged open, and chain 51 holds the rotatable parts at a convenient angle for an operator's inspection of the entire mold cavity.

Having inspected for cleanliness, and with backing ring placed against flanges 68–69, the actuator 36 is operated to retract mandrel 44 and all inner-mold structure carried thereby. Just prior to reaching the fully retracted position, flanges 68–69 interfere with the back wall 33, causing restoration of inner-mold shells 55–56 to the bore-determining radius desired in the molded product. Upon full retraction, the parts appear as in FIG. 13, in readiness for application of liner materials 11–12 (FIG. 3). The inner liner 11 is a pre-cut paper sheet, applied as a wrinkle-free envelopment of the expanded inner-mold assembly 55–56, the overlapped ends being taped at 13 with the exposed lapping end in the trailing direction, as displayed in FIG. 3 for the assumed case of mold rotation in the counterclockwise direction. The outer liner 12 is also pre-cut, but is preferably pretaped at 14–17 for conformance to the outer diameter of the molded product; again, the overlapped ends are oriented to present no snag of sheet material by the discharge pipe 45 in the course of injecting mold material between liners 11–12.

Having applied both liners, the hinged outer shell assembly is closed and locked (at 49), and door 57 is actuated to closed position. Chain 51 is disengaged from flange 22, and the mixing head 43 and is advanced to the mold assembly, with its discharge wand 45 entering via port 65 into the space between liners 11–12, the initial discharge point being set for a location about 75 percent in from the door 57, i.e., 75 percent of the length of the mold cavity. The front of the machine then has the appearance depicted in FIG. 14, with an exhaust fixture 112 positioned near the region of escaping fumes; fixture 112 may be retractably carried by the underslung framework of carriage 41.

The motor 32 is now started, to rotate the entire mold assembly 21, except for door 57, since wand 45 holds the door against rotation. Casting now proceeds on a timed cycle of mold-material injection, of mold rotation, and of wand retraction (actuator 44). Typically, for casting a four-foot length of conduit of foamed urethane having a 12-inch outer diameter and a 1.5-inch wall thickness, the advanced position of wand 45 is held for about 3 of the 10 seconds of the foam-feed cycle; mold rotation is in the order of 60 revolutions per minute. The 3-second period allows initial development of a circumferentially continuous body of foaming material at a location near to but short of the back wall 33; wand retraction then proceeds at a pace such that the release of foaming ingredients at head 43 is cut off (i.e., end of the 10-second injection) when discharge from wand 45 is still projected into the cavity, to the extent of about 25 percent of the cavity length. As soon as the wand is removed from the door 57, port 65 is closed, and the door is clutched to the rotating mold (at 67) by operation of crank 66. Rotation is allowed to continue another 10 seconds, thus assuring rotation as long as foaming material is filling out the cavity, it being understood that in the course of foam expansion, the outer liner 12 is necessarily forced into smooth and wrinkle-free conformance with outer-mold shells 52–53 and that both liners become bonded to the foamed plastic.

At the end of the 10 seconds of mold rotation with door 57 clutched to complete the mold, the rotary drive is terminated and the mold contents are allowed to cure to hardness, for a predetermined period, such as 7 minutes. It is then convenient to set the chain 51 to flange 22. The machine thus has the appearance depicted in FIG. 15 during the curing phase.

FIG. 16 shows the first phase of product removal, namely, opening the outer mold assembly at 47, and declutching and opening door 57. The small flash 10' of excess cured plastic which appears adjacent one of the ribs 106 is quickly trimmed off, without affecting the integrity or quality of the molded product 10. Door opening is quickly followed by an ejection stroke of actuator 36, to the projected position shown in FIG. 17; this initially removes contact of flanges 68–69 with the back wall 33 and establishes immediate collapse of the inner-mold shells 55–56. The product can be manually pulled off the inner-mold shells, or it can be held and picked off as the actuator 36 retracts the inner-mold assembly.

It will be seen that we have described a machine and method meeting all stated objects. The resulting products have excellent homogeneous distribution of foamed material and adhere to tolerance limitations previously unattainable. The change-over to a different size of bore or outer diameter is easily accomplished, and start-up entails negligible waste. The product of the machine and process is ready for immediate use, shipment, and/or slitting, as suggested in the description of FIG. 3.

While the invention has been described in considerable detail for a presently preferred embodiment, it will be understood that modifications may be made without departing from the invention.

What is claimed is:

1. The method of making a tubular article of foamed plastic material, which comprises selecting and horizontally orienting an elongate cupped annular mold closed at one end and openable at the other end by an attachable door having a closeable injection port said mold having elongate inner and outer rigid cavity walls conforming to the desired bore and outer surface profiles of the article, longitudinally introducing via the discharge end of an elongate discharge tube inserted through said injection port a foamable resin-forming reaction mixture between the inner and outer walls of the mold cavity at a location near the closed end thereof, longitudinally retracting the discharge end of the tube (a) while continuing to discharge into said mold cavity a quantity of said foaming mixture less than the volume of said mold cavity but at least sufficient to fill said cavity when said mixture is expanded, and (b) while also rotating said mold about a longitudinally extending horizontal axis, removing the discharge tube from said mold cavity, closing the other end of said mold cavity before the expanding mixture reaches said end, said rotation being at a speed such that maximum centrifugal acceleration on material in the mold cavity is less than gravitational acceleration, and thereafter continuing such rotation for a period of time to allow the discharged mixture to expand into and cure in the closed mold prior to opening thereof.

2. The method of claim 1, in which the discharge end of the tube is located near to but short of the closed end of the mold at initiation of discharge of said mixture into said cavity.

3. The method of claim 1, in which the discharge of said mixture into said mold cavity is terminated at a retracted tube location short of tube withdrawal from said cavity.

4. The method of claim 1, and including the further step of lining said inner and outer cavity walls with sheet material to form a composite foamed plastic article.

5. The method of claim 1, in which discharge of said mixture is commenced a period of time prior to tube retraction.

6. The method of claim 1, in which mold rotation is terminated a length of time prior to mold opening.

7. The method of casting a hollow cylinder of foamed plastic material which comprises providing a cylindrically shaped rigid collapsible mandrel, concentrically surrounding said mandrel with a rigid cylindrical mold, whereby to form an annular molding space between said mandrel and said mold, closing the other end of said annular molding space by an attachable door having a closeable injection port, horizontally orienting and rotating said mandrel and mold simultaneously at substantially the same angular velocity, said rotating being at a speed such that maximum centrifugal acceleration on material in the mold cavity is less than gravitational acceleration, uniformly feeding and distributing through said annular molding space via an elongated discharge tube inserted into said injection point a quantity of foamable resin-forming reaction mixture, the quantity of said mixture being less than the volume of said annular space but at least sufficient to fill said space when said mixture is expanded, removing said tube from said space and fully closing the annular space, allowing the foaming mixture to expand and fill the closed annular space, allowing the expanded mixture to cure in situ to a rigid hollow cylindrical shape, then opening said other end of said molding space and collapsing the mandrel and removing the rigid hollow cylinder from said mold.

8. The method of making a tubular article of foamed plastic material, which comprises selecting an openable annular mold having rigid inner and outer cavity walls conforming to the desired bore and outer surface profiles of the article, said mold being closeable by a attachable door having a closeable injection port, horizontally orienting said mold, uniformly discharging and distributing via an elongate discharge tube inserted through said port a quantity of foamable resin-forming reaction mixture into the mold cavity while also rotating the mold about its axis, fully closing said mold while continuing rotation of said mold, the quantity of said mixture being less than the volume of said mold cavity but at least sufficient to fill said cavity when said mixture is expanded, said rotation being at a speed such that maximum centrifugal acceleration on material in the mold cavity is less than gravitational acceleration, thereafter continuing such rotation for a period of time to allow the discharged mixture to foam and fill the mold and to cure in situ to a rigid tubular shape, and then opening the mold to remove the rigid article.

9. The method of making a tubular article of foamed plastic material, which comprises selecting and horizontally orienting an elongate cupped annular mold closed at one end and openable at the other end by an attachable door having a closeable injection port and having elongate inner and outer rigid cavity walls conforming to the desired bore and outer surface profiles of the article, selecting a foamable resin-forming reaction mixture and its means of supply with an elongate discharge tube, longitudinally introducing the discharge end of the tube into the mold cavity and between the inner and outer walls thereof to a location near the closed end thereof, longitudinally retracting the discharge end of the tube (a) while discharging into the mold cavity a quantity of said foamable resin-forming reaction mixture less than the volume of said mold cavity but at least sufficient to fill said cavity when said mixture is expanded, and (b) while also rotating the mold about a longitudinally extending horizontal axis, removing the discharge tube from the mold cavity, closing the other end of the mold cavity before the expanding mixture fills the cavity, said rotation being at a speed such that maximum centrifugal acceleration on material in the mold cavity is less than gravitational acceleration, and thereafter continuing such rotation for a period of time to allow the discharged mixture to expand into and cure in the closed mold prior to opening thereof.

* * * * *